Oct. 3, 1933.  N. C. CHRISTENSEN  1,929,349
APPARATUS FOR SEPARATING OXYGEN AND NITROGEN IN AIR
Filed Dec. 10, 1929  2 Sheets-Sheet 1
FIG. I.
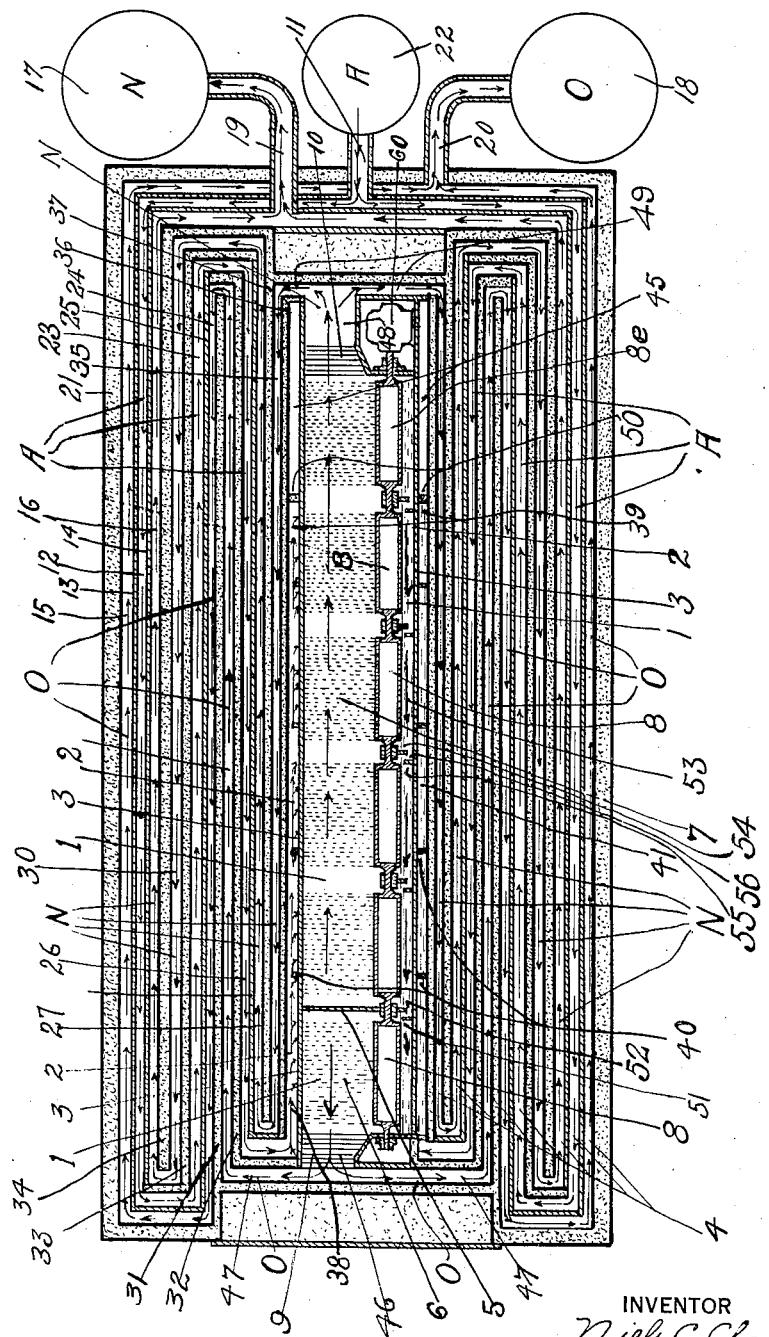
INVENTOR
Niels C. Christensen

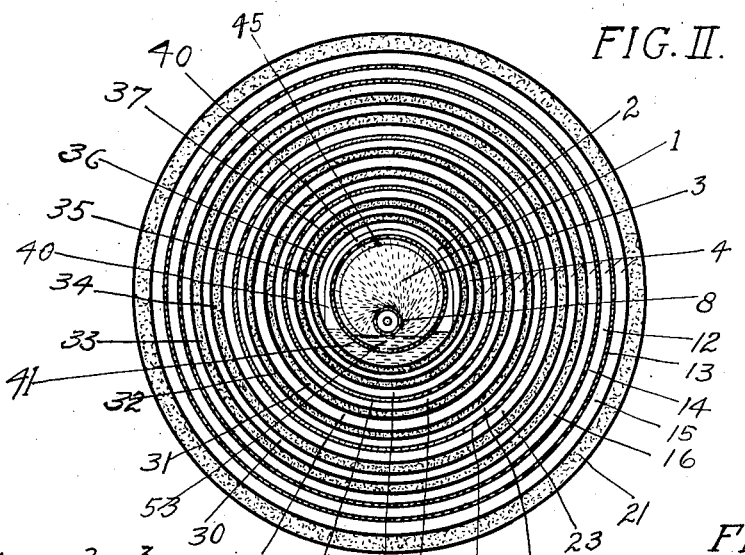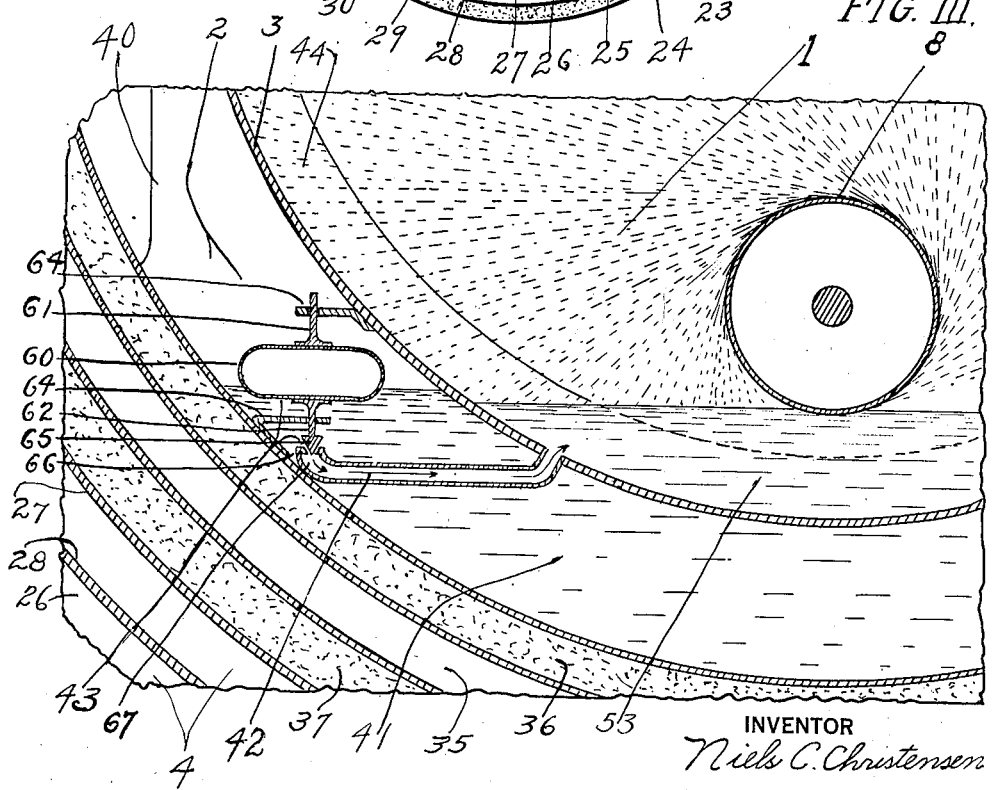

Patented Oct. 3, 1933

1,929,349

UNITED STATES PATENT OFFICE 1,929,349

APPARATUS FOR SEPARATING OXYGEN AND NITROGEN IN AIR

Niels C. Christensen, Salt Lake City, Utah

Application December 10, 1929
Serial No. 413,088

26 Claims. (Cl. 62—122)

This invention relates to a process and apparatus for the separation of the oxygen and nitrogen in air by liquefaction and fractional distillation or differential evaporation. In the processes now in common use for the production of oxygen and nitrogen from air, the liquefaction is carried out at a pressure of approximately 750 pounds per square inch, and the power consumed is from 10 to 15 times that theoretically required for the separation of the two gases. It is the object of my invention to greatly reduce this power consumption and make possible the carrying out of the process at relatively low pressures, thus greatly reducing the expense of producing the separate gases and also avoiding the necessity for high pressure compressors and liquefaction apparatus.

I attain these objects by an especially efficient transfer of heat from the incoming air to the separated gases leaving the apparatus, and particularly by an especially efficient transfer of heat to the evaporating liquid in the fractionating still, or, differential evaporator, from the air which is condensing or liquefying in the condenser. This last heat transfer is made possible by bringing the evaporating liquid under a lower pressure and the liquefying air at a sufficiently higher pressure into simultaneous contact with opposite sides of the heat transfer wall which separates the liquefying chamber and the evaporating chamber. The operation of the process depends primarily upon the efficiency of this heat transfer between the fluids on opposite sides of the heat transfer wall or membrane in the still, and especially on the maintenance of sufficient difference in the latent heats of the liquids on opposite sides of the heat transfer membrane to maintain the process, i. e., sufficient difference in pressure that the latent heat of the evaporating liquid shall be sufficiently greater than the latent heat of the condensing fluid, and the temperature of evaporation shall be sufficiently lower than the temperature of condensation to make up for heat losses and insure continuance of the process of condensation and evaporation. To insure this, substantially all of the latent heat given up in the liquefaction or condensation of the air must be transferred to the evaporating liquid and be absorbed in the gases formed. This heat transfer, therefore, involves little change in the temperature of either the condensing gases or the evaporating liquid, and the difference in pressure must therefore be sufficient to insure enough difference in temperature to secure a fairly rapid transfer of heat through the heat transfer wall and sufficient difference in the latent heats of the liquids on opposite sides of the heat transfer wall to make up for all heat losses in the process. There must also be an efficient counter current transfer of heat from the incoming air to the outflowing separated gases to insure that the temperature of the air entering the condensing chamber of the apparatus is so low that practically all that is necessary to secure its condensation or liquefaction is the transfer of the latent heat of condensation through the heat transfer wall to the evaporating liquid in the evaporating chamber or still. In order to secure a practically complete separation of the oxygen and nitrogen, I also utilize the fractional condensation of the liquefying air, which is very efficiently secured by my method and apparatus, so as to separate the oxygen and nitrogen as far as possible during the liquefying operation, and introduce these differential condensates at such points in the evaporator as to secure the most efficient action in this apparatus in separating the oxygen and nitrogen.

To make up for the lack of perfect efficiency in heat transfer between the incoming air and outgoing gases, I may also pre-cool the incoming air and thus reduce the difference in pressure under which the process operates.

It will be evident from the foregoing, that the successful operation of my process does not depend upon its being carried out at any certain definite pressures, but only on the maintenance of sufficient difference of pressure in the condensing, or liquefying chamber and the evaporating chamber. However, four rather distinct conditions of operation with regard to the pressure employed, may be used, as noted in the following: The process may be operated with (1) both the incoming air and outgoing gases at pressures higher than atmospheric, the incoming air being at sufficiently higher pressure than the outgoing separated gases to maintain the operation of the process: or, (2) the outgoing gases from the evaporating chamber may be at substantially atmospheric pressure, the air in the condensing chamber being supplied at the required higher pressure as described in the foregoing: or (3) the air in the condensing chamber may be supplied at atmospheric pressure and the gases in the evaporating chamber may be withdrawn under a sufficient vacuum to secure the desired difference in pressure: or (4) the air may be supplied to the condensing chamber at a pressure above atmospheric, and the gases in the evaporating chamber may be withdrawn at partial atmospheric pressure, sufficient difference in pressure being maintained to insure the continuance of the process. The first method requires the smallest condensing and evaporating and heat transfer apparatus, since the volume of gases handled is less than in cases 2 to 4, but has the disadvantage of operating at higher pressure. The second method avoids high pressures and requires no vacuum pumps, and will commonly be used, with a pressure in the evaporating chamber sufficiently above atmospheric pressure to send the separated gases to their respective containers, or holders, without the use of extra compressors other than the one supplying the incoming air. The third method requires the largest condensing and evaporating and heat transfer apparatus and also requires two large vacuum pumps, but operates at atmospheric and lower than atmospheric pressures. The fourth method is a compromise between methods, two and three as to pressures and size of heat transfer, condensing, and evaporating apparatus, but requires a compressor to supply the air and two vacuum pumps to withdraw the separated gases.

If the oxygen is to be discharged in liquid form the incoming air must either be pre-cooled to make up for the cooling effect lost by not evaporating the oxygen, or the process must be operated with a very much greater difference in pressure, or less pre-cooling with an increase in pressure difference may be used. The preferred method is that of pre-cooling the incoming air in order to avoid high pressures. It should be particularly noted in connection with pre-cooling of the incoming air that with a sufficient degree of pre-cooling of the incoming air the difference in pressure between the gases in the condensing and evaporating chambers may be reduced to a point just sufficient to give the desired flow of gas through the apparatus. It will thus be apparent that the process will operate with pressure difference alone or with a combination of pressure difference and pre-cooling, or mainly with pre-cooling with relatively small pressure difference.

From the foregoing description, it will be apparent that my process differs entirely from the processes of Linde and Claude, as it does not in any way utilize or depend upon the Joule-Thompson effect which is utilized in the Linde process, or the cooling effect secured by expansion of the compressed air in an engine, as used in the process of Claude.

In order to carry out my process with the highest efficiency, I prefer to use a special form of condensing and evaporating apparatus, and also a special form of heat transfer apparatus, as described and figured below, but the process is not entirely dependent upon these, and, though they are the preferred apparatus for these purposes, I do not desire to be limited entirely to them as the process may possibly be carried out in other forms of apparatus.

A preferred embodiment of the apparatus comprising my invention is illustrated in the accompanying drawings, in which:

Fig. I is a vertical longitudinal section of the apparatus, showing the relationship of the condensing and evaporating chambers, and illustrating the flow of gases and liquid therethrough, the drawing showing the manner in which the evaporating liquid and condensing fluid are brought into heat exchanging relation and the evaporated gases and evaporating liquid mixed to secure the desired selective distillation.

Fig. II is a vertical cross section also showing the relationship of the condensing and evaporating chambers and the manner in which the evaporating liquid is brought into heat exchanging relation with the condensing gases.

Fig. III is an enlarged partial cross section of the apparatus showing a valve mechanism for regulating the flow of condensed gases from the condensing chamber to the evaporating chamber.

The following detailed description of the apparatus and its method of operation will enable those skilled in the art to understand the invention.

In the following, the description of the apparatus and of the method of operation, i. e., the process and apparatus are combined in order to avoid unnecessary duplication and to secure a clearer setting forth of both the process and apparatus. In this description, it is assumed that the process has been in operation for a sufficient length of time to secure stable conditions. To start the process in the apparatus described, it is necessary to secure a supply of liquid air from some other source as the apparatus is not self-starting under the stable conditions of operation.

The preferred type of apparatus for the carrying out of my process consists essentially of an evaporating chamber (1) surrounded by a condensing chamber (2), separated by a heat transfer wall (3), which is in turn surrounded by a series of counter-current heat interchange passages (4), all so arranged as to secure the most efficient heat transfer and to prevent ingress of heat from the surrounding air. The evaporating chamber (1) is preferably cylindrical in form as shown in the sketches, and is surrounded by the annular condensing chamber (2) which is in turn surrounded by the concentric annular heat transfer passages (4). The evaporating chamber is divided into two parts by the vertical partition wall (5) which separates the oxygen chamber (6), in which the liquid oxygen is evaporated, from the main fractionating or differential evaporation chamber (7) in which the nitrogen is evaporated and separated from the liquid oxygen. In the lower part of the evaporating chambers (6) and (7) are placed horizontal spray cylinders (8) which are arranged to revolve rapidly on their horizontal axes at such a speed that when the liquid air (or oxygen) rises to such a level that the liquid touches the lower portion of the rotating cylinders, the liquid is thrown against the heat transfer wall (3) in the form of a spray which also fills the spaces (6) and (7) in the evaporating chambers. These spray drums or cylinders are rotated by the enclosed motor (60). To prevent the carrying out of any liquid spray by the gases leaving the chambers, the baffles or eliminators (9) and (10) are placed at the exit ends of the spray chambers (6) and (7). The air, or purified mixture of oxygen and nitrogen, to be separated, enters through the inlet pipe (11) from the purifier or compressor (22) as indicated by the letter A and the arrow showing the direction of flow, and flows through the annular heat transfer passage (12) counter current to both the outflowing separated nitrogen (N) and oxygen (O), as indicated by the respective letters and arrows showing the direction of flow, and transfers its heat to these outflowing gases through the concentric heat transfer walls (13) and (14). The warmed nitrogen and oxygen pass outward through the concentric annular passages (15) and (16) and are discharged to their respective vacuum pumps, or gas holders (17) and (18), (as the case may be) through the exit pipes (19) and (20). The entire apparatus is surrounded by a layer of heat insulating material (21) to prevent loss of heat in the process. The ingoing mixture of partially cooled air from the counter-current heat transfer passage next flows through the second annular heat transfer passage (23) counter current to the outflowing oxygen in the annular passage (24) and is further cooled by transfer of more of its heat to the outflowing cold oxygen through the heat transfer wall (25). The cold air from the passage (23) then flows through the third heat transfer passage (26) counter-current to the outflowing nitrogen in the annular passage (27) and is further cooled by transfer of more of its heat to the outflowing nitrogen through the heat transfer wall (28). The air or purified mixture of nitrogen and oxygen is now cooled to the point where it is ready for admission to the condensing chamber (2) for liquefaction or condensation. It should be noted that in this counter-current cooling process through which the air passes up to this point, that the cooling process has secured the highest possible efficiency by the succession of steps used, the final cooling of the air being made by transfer of heat to the nitrogen which is the colder of the two exit gases, this final cooling being preceded by transfer of heat to the oxygen, and this step being preceded by simultaneous transfer of heat from the air to both the nitrogen and oxygen. In order to maintain this succession of steps and to secure the required direction of flow of the different gases, the passages in which these respective heat transfer steps are carried out are separated by the gas transfer passages (29) and (30) formed by the heat insulating walls (31), (32), (33), and (34) which also prevent excessive radial flow of heat from the exterior of the apparatus to the interior.

The exterior gas heat transfer portion of the apparatus described in the foregoing is insulated from the interior condensing and evaporating heat transfer portion of the apparatus by the annular nitrogen passage (35) and the two concentric heat insulating walls (36) and (37) so that the transfer of heat between the evaporating liquid and condensing liquid is independent of the gaseous heat transfer stage. It should be noted that the arrangement shown by which the condenser (2) is separated from the exterior portion of the apparatus by the two insulating walls (36) and (37) and by the passage (35) filled with the cold nitrogen prevents in the most efficient manner any transfer of heat to the condensing and evaporating chambers and assures that any heat transfer taking place in these chambers must be between the evaporating liquid in the evaporating chamber (1) and the condensing liquid in the condensing chamber (2).

The cold air coming from the final heat transfer passage (26) is cooled practically to the point of liquefaction or condensation and requires only a slight drop in temperature and the withdrawal of its latent heat of condensation to bring about its condensation or liquefaction. This cold mixture of oxygen and nitrogen flows from the passage (26) into the oxygen end (38) of the closed annular condensing chamber (2) and comes into contact with the heat transfer wall (3) against which the liquid oxygen in chamber (6) and liquid mixture of nitrogen and oxygen in chamber (7) are being thrown by the spray drums (8). As the liquids in the chambers (6) and (7) are at a lower temperture than the gases in the condensing chamber (2), there is a transfer of heat from the gases in (2) through the heat transfer wall (3) to the liquids in (6) and (7) which, since the gases in the evaporating chambers (6) and (7) are at a lower pressure than the gases in the condensing chamber (2), causes the evaporation of the liquids in (6) and (7) and the condensation or liquefaction of the gases in (2), the latent heat of condensation of the gases in the condensing chamber (2) being transferred through the heat transfer membrane or wall (3) and supplying the latent heat of evaporation of the liquids in the evaporating chambers (6) and (7). Theoretically only a very small difference in pressure between the gases in the condensing chamber (2) and evaporating chamber (1) is required but in order to secure a reasonable capacity for the apparatus, the pressure in the evaporating chamber (1) must be sufficiently lower than pressure of the gases in the condensing chamber to give sufficient difference in temperature, i. e., sufficiently lower temperature in the evaporating chamber, to secure a reasonably rapid transfer of heat through the heat transfer membrane (3) from the condensing gases in (2) to the evaporating liquids in (1) and also to make up for the difference between the actual heat transfer secured between the incoming air and outflowing separated gases and perfect heat transfer. The required difference in pressure will, therefore, depend upon the rate at which the apparatus is run and the efficiency of the heat transfer between the gases, and will vary with change in these conditions. The required difference in pressure will also depend upon the amount of pre-cooling given the incoming air, which pre-cooling may be used to reduce the required pressure difference to a very small amount. The method of heat transfer secured by spraying the evaporating liquid against the inner side of the heat transfer membrane (3) and the rapid removal of the condensed gases from the opposite or outer side of this wall is especially efficient and insures a relatively high capacity for the apparatus.

The mixture of cold nitrogen and oxygen entering the condensing chamber (2) and coming into contact first with the portion of the membrane (3) in contact with the liquid oxygen in chamber (6) is cooled to such a point that condensation commences and as the gas passes toward the opposite closed end of the chamber and comes into contact with the portion of the heat transfer wall or membrane (3) in contact with the sprayed liquid in (7) the condensation continues as fast as the latent heat of condensation of the gases in (2) is transferred to the evaporating liquid in (1). The condensation or liquefaction of the air is selective, the first portions of the condensate near the inlet end of the condensing chamber (or oxygen end of the evaporating chamber) (38), being much richer in oxygen than the condensate formed toward the opposite end of the condensing chamber (or nitrogen end of the evaporating chamber) (39). Advantage is taken of this fact to increase the efficiency of separation of the oxygen and nitrogen in the evaporating chamber by introducing the condensate richest in oxygen toward the oxygen end (38) of the evaporating chamber (6) and the condensate richest in nitrogen toward the opposite end (39) of the chamber (7) and the intermediate condensates at suitable points between these two extremes. This separation into different selective condensates is carried out by placing suitable radial partitions (40) in the condensing chamber (2) which partitions extend out perpendicularly from the heat exchange wall (3). The partitions divide the lower part of the chamber (2) into separate pockets (41), by extending from the wall (3) to the wall (36), down into which the condensate from the upper part of the chamber runs as fast as it is formed. From these pockets (41) the different condensates are fed to the desired places in the evaporating chamber (6) through the pipes (42) and automatic valves (43) (shown only in Fig. III) which control the flow of fluid from the condensate pockets (41) to the desired places in the evaporating chamber (7). The upper part of the partitions, i. e., from slightly above the liquid level in the evaporating chamber (1), do not extend out to the wall (36), but leave sufficient room between their outer edges and the wall (36) to allow a free flow of the incoming gases from the inlet end (38) of the condensing chamber to the opposite closed end (39). The valves (43) are so arranged that when the liquid in the pockets (41) reach a level slightly above the level of the liquid in the evaporating chambers (1) they open sufficiently to allow the higher pressure in (2) to force the liquid into the chamber (1) until the liquid level in (2) drops slightly, thus maintaining a substantially constant liquid level in the pockets (41) and giving an approximately uniform and controlled flow of condensate into the evaporating chamber (1) as the condensate forms in the condensing chamber (2). As previously noted, the evaporating chamber (1) is divided into two separate parts by the vertical partition wall (5) and solution baffle (44) which prevent the passage of any gas between the evaporating chambers (7) and (6), but allows a flow of liquid from (7) into (6) through the channel (52) between the lower part of the partition (5), which extends down below the liquid level, and the baffle (44). The lower part of the evaporating, or fractionating chamber (7), i. e., the portion occupied by the liquid, is divided into separate divisions (53) by the baffles (54) and (55) which allow a flow of liquid from the lower part of the separate containers through the passage (56) as indicated by the arrow at these points. To prevent excessive mixing of the liquid by splashing when the sprayed drops impinge upon the surface of the heat interchange wall (3) radial partitions (44) may extend out a short distance from the wall (3) down to a point just below the solution level in the lower part of the chamber (6). When the liquid in the pockets (41) reach such a level that the upper surface of the liquid touches the lower part of the rotating spray drums (8) the liquid is thrown tangentially as a solid fan of spray or rain from the surface of the drum to the inside surface of the heat interchange wall (3) keeping this wall wet with the evaporating liquid. The action of the rotating cylinder as a spraying device is fully described in my U. S. Patent #1,462,363.

The valves (43) for automatically regulating the flow of liquid from the condensing chamber (2) to the evaporating chamber (1) may be constructed as diagrammatically shown in Fig. III, though other types of valves may be used and which are operated by a float as shown, or may be electrically operated. The valve shown in Fig. III consists of a float (60) supported by the rods (61) and (62) which slide in the guides (64). At the lower end of the rod (62) is a needle valve (65) which rests in the valve seat (66) at the inner end (67) of the outlet pipe (42) which carries the liquid from the condensing chamber (2) to the evaporating chamber (1). The valve operates as follows: when the liquid level in (2) is low, the float sinks and the needle (65) closes the hole in the valve seat (66) shutting off the flow of liquid through the pipe (42) from the condensing chamber (2) to the evaporating chamber (1). As the level of the liquid rises in the condensing chamber, the float (60) rises and lifts the needle (65) out of its seat (66) allowing the liquid to flow from (2) to (1) through the pipe (42). The valve thus maintains a substantially constant liquid level in the pockets (41) in the condensing chamber.

As previously noted the evaporating chamber (1) is divided into two portions, the oxygen evaporating chamber (6) and the fractionating chamber (7). As will be noted, the oxygen evaporating chamber (6) is smaller than the fractionating chamber (7), the two being proportioned so that the portion of the transfer wall (3) in each chamber is proportional to the amount of heat transferred in evaporating the oxygen from the chamber (6) and in evaporating the nitrogen from the chamber (7), this ratio being roughly as 1:4 as indicated in the sketch. The same ratio between the spray drum surface is also maintained, the surface of spray drum in the fractionating chamber proper, being approximately four times that in the oxygen chamber, i. e., as shown in the drawings, four drums being used in the described fractionating or evaporating chamber (7) and one drum in the oxygen chamber (6). As will be noted on the sketch, the condensing chamber (2) extends only to the partition (50), the space (45) beyond this point not being used. The evaporating portion of the fractionating chamber (7) also extends only to this point as there is no heat transfer from the space (45) beyond this point. The extra spray drum (8e) at the nitrogen exit end of the chamber (7), corresponding to the unused space (45), is used to throw a spray of liquid through which the nitrogen must pass on leaving the fractionating chamber (7), this spray, which is not receiving any heat transfer from the condensing chamber (2) serving to remove the oxygen more completely from the nitrogen leaving the evaporating portion of the chamber (7). If desired more than one of these extra drums (8e) may be used to secure a purer nitrogen gas. As previously noted, the condensation in the chamber (2) is selective, produces liquid richer in oxygen near the inlet end (38) of the chamber (2) and progressively poorer in oxygen toward the opposite end (39) of the chamber (2). The evaporating action of the chamber (6) is also selective. The liquid air is sprayed by the rotors or drums (8), and the nitrogen evaporates more rapidly than the oxygen so that the unevaporated liquid flowing down the inside of the spray chamber wall (3) into the liquid in the lower part of the chamber is enriched in oxygen. The liquid spray in the chamber (7) is also intimately mixed with the gas in the chamber which results in a condensation of any evaporated oxygen and the evaporation of any liquid nitrogen. The very intimate mixture of gas and fine spray in the chamber (7) is especially effective in bringing about this selective evaporation. The result of this selective evaporation is that the liquid oxygen accumulates in the lower part of the chamber (7) and since it can only escape through the oxygen evaporating chamber (6), it flows toward this chamber the nitrogen being progressively removed as the liquid flows toward the chamber (6) so that the liquid flowing into (6) through the liquid seal (52) is practically pure oxygen or a liquid very rich in oxygen. This liquid is evaporated by being sprayed against the heat transfer wall (3) in this chamber and the oxygen gas passes out to the counter-current heat transfer (29) through the outlet opening (46) and passages (47). The nitrogen can only escape through the outlet opening (48) at the opposite end of the chamber (6) and as the nitrogen gas accumulates in the chamber, it flows through the sprayed liquid toward this outlet (48) being washed by the sprayed liquid thrown by the spray drums (8) and progressively depleted in oxygen as it passes toward the outlet (48), the final washing being carried out by the washing spray drum (8e). The gas escaping from the outlet (48) into the passage (49), therefore carries very little oxygen and may be practically pure nitrogen. It will be apparent that due to the selective action both in the condensation chamber (2) and evaporating chamber (1) a very efficient separation of the oxygen and nitrogen may be secured.

It will also be apparent that due to the efficient heat transfer secured between the condensing gases and the evaporating liquid a relatively small difference in pressure in the condensing chamber (2) and evaporating chamber (1) will be required providing an efficient transfer of heat is secured between the incoming air and outflowing separated gases, which latter heat transfer is very efficiently carried out by the method previously described.

As previously mentioned, it will be apparent from the foregoing that my process is not self-starting, but that a sufficient supply of liquid air must be introduced into the evaporating chamber (1) to start the condensation in the condensing chamber (2). After the process has been started and brought to a stable operating condition, it will be apparent that with sufficient difference in pressure between the condensing and evaporating chambers, or with pre-cooling of the incoming air and maintenance of sufficient, such, smaller difference in pressure, the process is self-sustaining and substantially automatic in its operation.

In the foregoing description of my preferred type of apparatus, the preferred type of spraying device is the rotating cylinder described. Discs or paddles might be used though they are very much less efficient both in making of a suitable spray and in the amount of power consumed. The spray drums are therefore very much preferred.

No claim is made herein to the method as above set forth as the same forms the subject matter of my divisional application Serial Number 494,156, filed November 7, 1930, pursuant to the requirement of the Patent Office.

Having described my process, what I claim and desire to patent is:

1. The apparatus for separating oxygen and nitrogen in air which consists of a counter-current heat interchanger for transferring heat from the incoming air to the outgoing separated gases, a condensing chamber and a parallel longitudinal evaporating chamber having a common heat interchange wall, means for bringing cold air from said counter-current cooler into contact with said heat transfer wall in said condensing chamber and means for bringing liquefied gases into contact with said heat transfer wall and means for passing condensed gases from said condensing chamber into said evaporating chamber.

2. The apparatus for separating oxygen and nitrogen in air which consists of a counter-current heat interchanger for transferring heat from the incoming air to the outgoing separated gases, a longitudinal condensing chamber and a parallel longitudinal evaporating chamber having a common heat interchange wall, means for bringing cold air from said counter-current cooler into contact with said heat transfer wall in said condensing chamber and means for bringing liquefied gases into contact with said heat transfer wall and means for passing condensed gases from said condensing chamber into said evaporating chamber, together with means for supplying the cooled air to said condensing chamber at a sufficiently higher pressure and for withdrawing the evaporated gases from said evaporating chamber at a sufficiently lower pressure to cause the condensation of the supplied air in said condensing chamber and the evaporation of said liquid in said evaporating chamber.

3. The apparatus for separating oxygen and nitrogen in the air which consists of a counter-current heat interchanger for transferring heat from the incoming air to the outgoing separated gases, a longitudinal condensing chamber and a parallel longitudinal evaporating chamber having a common heat interchange wall, means for bringing cold air from said counter-current heat interchanger into contact with said heat transfer wall in said condensing chamber and means for bringing liquefied gases into contact with said heat interchange wall in said evaporating chamber and means for bringing successive portions of condensate from said condensing chamber into successive parallel parts of said evaporating chamber.

4. The apparatus for separating oxygen and nitrogen in the air, which consists of a counter-current heat interchanger for transferring heat from the incoming air to the outgoing separated gases, a longitudinal condensing chamber and a parallel longitudinal evaporating chamber having a common heat interchange wall, means for bringing cold air from said counter-current heat interchanger into contact with said heat transfer wall in said condensing chamber and means for bringing liquefied gases into contact with said heat interchange wall in said evaporating chamber and means for bringing successive portions of condensate from said condensing chamber into successive parallel parts of said evaporating chamber, together with means for supplying the cooled air to said condensing chamber at a sufficiently higher pressure and for withdrawing the evaporated gases from said evaporating chamber at a sufficiently lower pressure to cause the condensation of the cold air supplied to said condensing chamber and the evaporation of said liquid in said evaporating chamber.

5. The apparatus for separting oxygen and nitrogen in air which consists of a counter-current heat interchanger arranged to transfer heat from the incoming air first to both of the outgoing separated gases simultaneously and then to the separated gas higher in oxygen and finally to the gas lower in oxygen, a longitudinal condensing chamber and a parallel longitudinal evaporating chamber having a common heat transfer wall, means for bringing cold air from said counter-current heat interchanger into contact with said heat transfer wall in said condensing chamber and means for bringing liquefied gases into contact with said heat interchange wall in said evaporating chamber and means for bringing successive portions of condensate from said condensing chamber into successive parallel parts of said evaporating chamber, said condensing chamber being divided into two parts approximately proportional to the volumes of the separated gases, the smaller being near the gas entrance to said condensing chamber, and means for allowing a flow of condensed liquid into said smaller part from said larger part of said evaporating chamber.

6. The apparatus for separating oxygen and nitrogen in air which consists of counter-current heat interchanger arranged to transfer heat from the incoming air first to both of the outgoing separated gases simultaneously and then to the separated gas higher in oxygen and finally to the gas lower in oxygen, a longitudinal condensing chamber and a parallel longitudinal evaporating chamber having a common heat transfer wall, means for bringing cold air from said counter-current heat interchanger into contact with said heat transfer wall in said condensing chamber and means for bringing liquefied gases into contact with said heat interchange wall in said evaporating chamber and means for bringing successive portions of condensate from said condensing chamber into successive parallel parts of said evaporating chamber, said condensing chamber being divided into two parts approximately proportional to the volumes of the separated gases, the smaller being near the gas entrance to said condensing chamber, means for allowing a flow of condensed liquid into said smaller part from said larger part of said evaporating chamber together with means for supplying said cooled air to said condensing chamber at a sufficiently higher pressure and for withdrawing the separated gases from opposite ends of said evaporating chamber at a sufficiently lower pressure to cause the condensation of the cold air supplied to said condensing chamber and the evaporation of said liquid in said evaporating chamber.

7. The apparatus for separating oxygen and nitrogen in air which consists of a counter-current heat interchanger for transferring heat from the incoming air to the outgoing separated gases, a horizontal cylindrical evaporating chamber surrounded by a concentric annular condensing chamber with a common heat transfer wall between said chambers, means for passing liquid from said condensing chamber into said evaporating chamber, horizontal spray drums in the lower part of said evaporating chamber for spraying condensed liquid against said heat transfer wall.

8. The apparatus for separating oxygen and nitrogen in air which consists of a counter-current heat interchanger for transferring heat from the incoming air to the outgoing separated gases, a horizontal cylindrical evaporating chamber surrounded by a concentric annular condensing chamber with a common heat transfer wall between said chambers, means for passing liquid from said condensing chamber into said evaporating chamber, horizontal spray drums in the lower part of said evaporating chamber for spraying condensed liquid against said heat transfer wall, together with means for supplying the cold air from said counter-current heat interchanger to said condensing chamber at a sufficiently higher pressure and for withdrawing the evaporated gases from opposite ends of said evaporating chamber at sufficiently lower pressure to cause condensation of the cold air supplied to said condensing chamber and the evaporation of said liquid in said evaporating chamber.

9. The apparatus for separating oxygen and nitrogen in air which consists of a counter-current heat interchanger for transferring heat from the incoming air first to both of the outgoing separated gases simultaneously and then to the separated gas richest in oxygen and finally to the separated gas poorest in oxygen, a horizontal cylindrical evaporating chamber surrounded by a concentric annular condensing chamber with a common heat transfer wall between said chambers, means for passing liquid from said condensing chamber into said evaporating chamber, horizontal spray drums in the lower part of said evaporating chamber arranged to spray condensed liquid against said heat transfer wall.

10. The apparatus for separating oxygen and nitrogen in air which consists of a counter-current heat interchanger for transferring heat from the incoming air first to both of the outgoing separated gases simultaneously and then to the separated gas richest in oxygen and finally to the separated gas poorest in oxygen, a horizontal cylindrical evaporating chamber surrounded by a concentric annular condensing chamber with a common heat transfer wall between said chambers, means for passing liquid from said condensing chamber into said evaporating chamber, horizontal spray drums in the lower part of said evaporating chamber arranged to spray condensed liquid against said heat transfer wall together with means for supplying cold air from said counter-current heat interchanger to said condensing chamber at a sufficiently higher pressure and for withdrawing the evaporated gases from opposite ends of said evaporating chamber at sufficiently lower pressure to cause the condensation of the cold air supplied to said condensing chamber and the evaporation of the liquid supplied to said evaporating chamber.

11. The apparatus for separating oxygen and nitrogen in air which consists of a counter-current heat interchanger for transferring heat from the incoming air first to both of the outgoing separated gases simultaneously and then to the separated gas richest in oxygen and finally to the separated gas poorest in oxygen, a horizontal cylindrical evaporating chamber surrounded by a concentric annular condensing chamber with a common heat transfer wall between said chambers, means for introducing the cooled incoming air at one end of said condensing chamber, means for passing liquid from said condensing chamber into said evaporating chamber, horizontal spray drums in said evaporating chamber arranged to spray condensed liquid against said heat transfer wall, a partition dividing said evaporating chamber into two parts proportional to the volume of the separated gases, the smaller division of said chamber being at the end at which the cold air enters the condensing chamber, means for allowing a flow of liquid from said larger division of said evaporating chamber into said smaller division, means for withdrawing the evaporated gases from opposite ends of said evaporating chamber.

12. The apparatus for separating oxygen and nitrogen in air which consists of a counter-current heat interchanger for transferring heat from the incoming air first to both of the outgoing separated gases simultaneously and then to the separated gas richest in oxygen and finally to the separated gas poorest in oxygen, a horizontal cylindrical evaporating chamber surrounded by a concentric annular condensing chamber with a common heat transfer wall between said chambers, means for introducing the cooled incoming air at one end of said condensing chamber, means for passing liquid from said condensing chamber into said evaporating chamber, horizontal spray drums in said evaporating chamber arranged to spray condensed liquid against said heat transfer wall, a partition dividing said evaporating chamber into two parts proportional to the volume of the separated gases, the smaller division of said chamber being at the end at which the cold air enters the condensing chamber, means for allowing a flow of liquid from said larger division of said evaporating chamber into said smaller division, means for withdrawing the evaporated gases from opposite ends of said evaporating chamber together with means for supplying the cooled air to said condensing chamber at a sufficiently higher pressure and means for withdrawing the evaporated gases from said evaporating chamber at a sufficiently lower pressure to cause the condensation of the cold air supplied to said condensing chamber and the evaporation of the liquid entering said evaporating chamber.

13. The apparatus for separating oxygen and nitrogen in air which consists of a counter-current heat interchanger arranged to transfer heat from the incoming air first to both of the separated gases simultaneously and then to the separated gas richest in oxygen and finally to the separated gas poorest in oxygen, a horizontal cylindrical evaporating chamber surrounded by a concentric annular condensing chamber with a common heat transfer wall between said chambers, means for introducing said cooled incoming air at one end of said condensing chamber, horizontal spray drums in said evaporating chamber arranged to spray condensed liquid against said heat transfer wall, a partition dividing said evaporating chamber into two parts proportional to the volumes of the separated gases, the smaller of said divisions being at the end at which the cooled air enters the condensing chamber, means for allowing a flow of liquid from said larger division of said evaporating chamber into said smaller division, means for introducing successive condensates from successive parts of said condensing chamber into successive parts of said larger division of said evaporating chamber, means for withdrawing evaporated gases from opposite ends of said evaporating chamber.

14. The apparatus for separating oxygen and nitrogen in air which consists of a counter-current heat interchanger arranged to transfer heat from the incoming air first to both of the separated gases simultaneously and then to the separated gas richest in oxygen and finally to the separated gas poorest in oxygen, a horizontal cylindrical evaporating chamber surrounded by a concentric annular condensing chamber with a common heat transfer wall between said chambers, means for introducing said cooled incoming air at the end of said condensing chamber, horizontal spray drums in said evaporating chamber arranged to spray condensed liquid against said heat transfer wall, a partition dividing said evaporating chamber into two parts proportional to the volumes of the separated gases, the smaller of said divisions being at the end at which the cooled air enters the condensing chamber, means for allowing a flow of liquid from said larger division of said evaporating chamber into said smaller division, means for introducing successive condensations from successive parts of said condensing chamber into successive parts of said larger division of said evaporating chamber, means for withdrawing evaporated gases from opposite ends of said evaporating chamber, together with means for supplying the cooled air to said condensing chamber at a sufficiently higher pressure and withdrawing the evaporated gases from said evaporating chamber at a sufficiently lower pressure to cause condensation of the cold air supplied to said condensing chamber and evaporation of the liquid entering said evaporating chamber.

15. The apparatus for separating oxygen and nitrogen in air which consists of a horizontal cylindrical evaporating chamber surrounded by a concentric annular condensing chamber with a common heat transfer wall between said chambers, means for introducing cooled incoming air into one end of said condensing chamber, horizontal spray drums in the lower part of said evaporating chamber arranged to spray condensed liquid against said heat transfer wall, a partition dividing said evaporating chamber into two parts approximately proportional to the volumes of the separated gases, the smaller of said divisions being at the end at which the cooled air enters the condensing chamber, means for allowing a flow of liquid from said larger to said smaller division of said evaporating chamber, means for introducing successive condensates from successive parts of said condensing chamber into similar successive parts of the larger division of said evaporating chamber, means for withdrawing evaporated gases from opposite ends of said evaporating chamber, annular longitudinal counter-current heat transfer passages concentric with and surrounding said evaporating and condensing chambers, said annular heat transfer passages being arranged so that incoming air shall transfer heat counter-currently first to both of the outgoing separated gases simultaneously and then to the outgoing separated gas richest in oxygen and finally to the outgoing separated gas poorest in oxygen.

16. The apparatus for separating oxygen and nitrogen in air which consists of a horizontal cylindrical evaporating chamber surrounded by a concentric annular condensing chamber with a common heat transfer wall between said chambers, means for introducing cooled incoming air into one end of said condensing chamber, horizontal spray drums in the lower part of said evaporating chamber arranged to spray condensed liquid against said heat transfer wall, a partition dividing said evaporating chamber into two parts approximately proportional to the volumes of the separated gases, the smaller of said divisions being at the end at which the cooled air enters the condensing chamber, means for allowing a flow of liquid from said larger to said smaller division of said evaporating chamber, means for introducing successive condensates from successive parts of said condensing chamber into similar successive parts of the larger division of said evaporating chamber, means for withdrawing evaporated gases from opposite ends of said evaporating chamber, annular longitudinal counter-current heat transfer passages concentric with and surrounding said evaporating and condensing chambers, said annular heat transfer passages being arranged so that incoming air shall transfer heat counter-currently first to both of the outgoing separated gases simultaneously and then to the outgoing separated gas richest in oxygen and finally to the outgoing separated gas poorest in oxygen, together with means for supplying the incoming air at sufficiently higher pressure and withdrawing the evaporated gases at sufficiently lower pressure to cause condensation of the air supplied to said condensing chamber and evaporation of the liquid entering said evaporating chamber.

17. The apparatus for separating oxygen and nitrogen in air which consists of a horizontal cylindrical evaporating chamber surrounded by a concentric annular condensing chamber with a common heat transfer wall between said chambers, means for introducing cooled incoming air into one end of said condensing chamber, horizontal spray drums in the lower part of said evaporating chamber arranged to spray condensed liquid against said heat transfer wall, a partition dividing said evaporating chamber into two parts approximately proportional to the volumes of the separated gases the smaller of said divisions being at the end at which the cooled air enters the condensing chamber, a washing division at the opposite end of said evaporating chamber having a spray drum therein and enclosed by a heat insulating wall, means for allowing a flow of liquid from said larger division to said smaller division of said evaporating chamber, means for introducing successive condensates from successive parts of said condensing chamber into similar successive parts of said larger division of said evaporating chamber, means for withdrawing evaporated gases from opposite ends of said evaporating chamber, annular longitudinal counter-current heat transfer passages concentric with and surrounding said evaporating and condensing chambers, said annular heat transfer passages being arranged so that incoming air shall transfer heat counter-currently first to both of the outgoing separated gases simultaneously and then to the outgoing separated gas richest in oxygen and finally to the outgoing separated gas poorest in oxygen, said heat transfer passages being separated from said condensing chamber and from each other by heat insulating walls and the entire apparatus being surrounded by a heat insulating wall.

18. The apparatus for separating oxygen and nitrogen in air which consists of a horizontal cylindrical evaporating chamber surrounded by a concentric annular condensing chamber with a common heat transfer wall between said chambers, means for introducing cooled incoming air into one end of said condensing chamber, horizontal spray drums in the lower part of said evaporating chamber arranged to spray condensed liquid against said heat transfer wall, a partition dividing said evaporating chamber into two parts approximately proportional to the volumes of the separated gases, the smaller of said divisions being at the end at which the cooled air enters the condensing chamber, a washing division at the opposite end of said evaporating chamber having a spray drum but no heat transfer wall connecting with said condensing chamber, means for allowing a flow of liquid from said larger division to said smaller division of said evaporating chamber, means for introducing successive condensates from successive parts of said condensing chamber into similar successive parts of said larger division of said evaporating chamber, means for withdrawing evaporated gases from opposite ends of said evaporating chamber, annular longitudinal counter-current heat transfer passages concentric with and surrounding said evaporating and condensing chambers, said annular heat transfer passages being arranged so that incoming air shall transfer heat counter currently first to both of the outgoing separated gases simultaneously and then to the outgoing separated gas richest in oxygen and finally to the outgoing separated gas poorest in oxygen, said heat transfer passages being separated from said condensing chamber and from each other by heat insulating walls and the entire apparatus being surrounded by a heat insulating wall, together with means for supplying the incoming air at sufficiently higher pressure and withdrawing the evaporated gases at sufficiently lower pressure to cause condensation of the air supplied to said condensing chamber and evaporation of the liquid entering said evaporating chamber.

19. The apparatus for separating oxygen and nitrogen in air which consists of a horizontal cylindrical evaporating chamber surrounded by a concentric annular condensing chamber with a common heat transfer wall between said chamber, means for introducing cooled incoming air into one end of said condensing chamber, horizontal spray drums in the lower part of said evaporating chamber arranged to spray condensed liquid against said heat transfer wall, a partition dividing said evaporating chamber into two parts approximately proportional to the volumes of the separated gases, the smaller of said divisions being at the end at which the cooled air enters the condensing chamber, a washing division at the opposite end of said evaporating chamber having a spray drum but no heat transfer wall connecting with said condensing chamber, means for allowing a flow of liquid from said larger division to said smaller division of said evaporating chamber, means for introducing successive condensates from successive parts of said condensing chamber into similar successive parts of said larger division of said evaporating chamber, means for withdrawing evaporated gases from opposite ends of said evaporating chamber, annular longitudinal counter-current heat transfer passages concentric with and surrounding said evaporating and condensing chamber, said annular heat transfer passages being arranged so that incoming air shall transfer heat counter currently first to both of the outgoing separated gases simultaneously and then to the outgoing separated gas richest in oxygen and finally to the outgoing separated gas poorest in oxygen, said heat transfer passages being separated from said condensing chamber and from each other by heat insulating walls and the entire apparatus being surrounded by a heat insulating wall, together with means for supplying the incoming air at sufficiently higher pressure and withdrawing the evaporated gases at sufficiently lower pressure to cause condensation of the air supplied to said condensing chamber and evaporation of the liquid entering said evaporating chamber, and all arranged to secure a differential condensation of the incoming air and differential evaporation of the condensed gases and thereby secure a substantially complete separation of the oxygen and nitrogen in the treated gases.

20. In apparatus for liquefying air previous to differential evaporation, a condensing chamber surrounding a horizontal longitudinal evaporating chamber with a common heat transfer wall between said chambers and spray drums in said evaporating chamber arranged to spray condensed liquid in said evaporating chamber against said heat transfer wall.

21. In apparatus for liquefying air previous to differential evaporation, a condensing chamber surrounding a horizontal longitudinal evaporating chamber with a common heat transfer wall between said chambers and spray drums in said evaporating chamber arranged to spray condensed liquid in said evaporating chamber against said heat transfer wall, together with means for transferring condensed liquid from said condensing chamber to said evaporating chamber and means for supplying the cooled air entering said condensing chamber at sufficiently higher pressure and withdrawing the evaporated gases from said evaporating chamber at sufficiently lower pressure to cause condensation of the cooled air entering said condensing chamber and evaporation of the condensed liquid entering said evaporating chamber.

22. In apparatus for separating oxygen and nitrogen in air by differential evaporation, a condensing chamber surrounding a horizontal longitudinal evaporating chamber with a common heat transfer wall between said chambers and spray drums in said evaporating chamber arranged to spray condensed liquid in said evaporating chamber against said heat transfer wall, means for introducing incoming cooled air at one end of said condensing chamber and means for introducing successive condensates from successive parts of said condensing chamber into similar successive parts of said evaporating chamber.

23. In apparatus for separating oxygen and nitrogen in air by differential evaporation, a condensing chamber surrounding a horizontal longitudinal evaporating chamber with a common heat transfer wall between said chambers and spray drums in said evaporating chamber arranged to spray condensed liquid in said evaporating chamber against said heat transfer wall, means for introducing incoming cooled air at one end of said condensing chamber and means for introducing successive condensates from successive parts of said condensing chamber into similar successive parts of said evaporating chamber, together with means for supplying the cooled air entering said condensing chamber at sufficiently higher pressure and withdrawing the evaporated gases at sufficiently lower pressure to cause condensation of the cooled air entering said condensing chamber and evaporating of the condensed liquid entering said evaporating chamber.

24. In apparatus for separating oxygen and nitrogen in air, a counter-current heat transfer apparatus arranged to cool the incoming air by progressive counter-current transfer of heat from the incoming air first to both of the outgoing separated gases simultaneously and then to the separated gas richest in oxygen and finally to the separated gas richest in nitrogen, together with a condensing chamber surrounding a horizontal longitudinal evaporating chamber with a common heat transfer wall between the two chambers and spray drums in said chambers arranged to spray condensed liquid in said evaporating chamber against said heat transfer wall, means for introducing incoming cooled air from said heat transfer apparatus at one end of said condensing chamber, and means for introducing successive condensates from successive parts of said condensing chamber into similar successive parts of said evaporating chamber.

25. In apparatus for separating oxygen and nitrogen in air, a counter-current heat transfer apparatus arranged to cool the incoming air by progressive counter-current transfer of heat from the incoming air first to both of the outgoing separated gases simultaneously and then to the separated gas richest in oxygen and finally to the separated gas richest in nitrogen, together with a condensing chamber surrounding a horizontal longitudinal evaporating chamber with a common heat transfer wall between the two chambers and spray drums in said chambers arranged to spray condensed liquid in said evaporating chamber against said heat transfer wall, means for introducing incoming cooled air from said heat transfer apparatus at one end of said condensing chamber, and means for introducing successive condensates from successive parts of said condensing chamber into similar successive parts of said evaporating chamber, together with means for supplying the incoming air at a sufficiently higher pressure and withdrawing the separated gases at a sufficiently lower pressure to cause condensation of the cooled air entering the condensing chamber and evaporation of the condensed liquid entering the evaporating chamber.

26. In apparatus for cooling air previous to liquefaction, the combination of means for separating oxygen and nitrogen in air with a conduit for the separated oxygen, a conduit for the separated nitrogen, and means for conducting the incoming air into said means for separating said gases in counter-current heat exchange relation with the gases in both of said conduits, and thereafter in counter-current heat exchange relation first with the gas in said oxygen conduit and then with the gas in said nitrogen conduit.

NIELS C. CHRISTENSEN.